(12) United States Patent
Dietrich

(10) Patent No.: US 6,644,240 B1
(45) Date of Patent: Nov. 11, 2003

(54) MILKING DEVICE PROVIDED WITH CLEANSING MEANS

(75) Inventor: Berhtold Johannes Theodorus Dietrich, Gorssel (NL)

(73) Assignee: Rieberjo B.V., Gorssel (NL)

( * ) Notice: Subject to any disclaimer, the term of this patent is extended or adjusted under 35 U.S.C. 154(b) by 0 days.

(21) Appl. No.: 09/719,619

(22) PCT Filed: Jun. 22, 1999

(86) PCT No.: PCT/NL99/00384

§ 371 (c)(1),
(2), (4) Date: Jan. 16, 2001

(87) PCT Pub. No.: WO99/66787

PCT Pub. Date: Dec. 29, 1999

(30) Foreign Application Priority Data

| Jun. 22, 1998 | (NL) | ............................................. 1009461 |
| Jan. 21, 1999 | (NL) | ............................................. 1011104 |
| Apr. 9, 1999 | (NL) | ............................................. 1011765 |

(51) Int. Cl.⁷ ................................................. A01J 5/04
(52) U.S. Cl. .................................................. 119/14.47
(58) Field of Search .......................... 119/14.01, 14.02, 119/14.06, 14.08, 14.18, 14.28, 14.31, 14.37, 14.38, 14.51, 14.47, 14.54, 14.55

(56) References Cited

U.S. PATENT DOCUMENTS 5,850,845 A * 12/1998 Pereira et al. .............. 137/239
6,089,242 A * 7/2000 Buck ........................ 134/57 R
6,276,297 B1 * 8/2001 van den Berg et al. ... 119/14.01
6,302,058 B1 * 10/2001 Dahl et al. ............... 119/14.47
6,308,655 B1 * 10/2001 Oosterling ............... 119/14.08
6,371,046 B1 * 4/2002 Petterson et al. ........ 119/14.02

FOREIGN PATENT DOCUMENTS

| DE | 2622794 | 12/1977 |
| EP | 0332235 | 9/1989 |
| EP | 0543463 | 5/1993 |

* cited by examiner

Primary Examiner—Thomas Price
(74) Attorney, Agent, or Firm—Ladas & Parry

(57) ABSTRACT

Device for pneumatically milking a cow, including a number of milk extractors, each having a teat cup as well as a milk line connected to the lower end of the teat cup, which leads from the teat cup to a collection chamber for the milk from the teat cups. Each milk extractor is provided with a supply for a cleansing medium, such as a disinfectant, to the teat cup in particular to the teat present in the teat cup. The supply has a line which at the location of an outlet debouches into the milk extractor, in particular the milk line, and each milk extractor is provided with structure for closing off the milk extractor near or downstream of the outlet when discharging the cleansing medium through the outlet. The structure for closing off the milk extractor is preferably arranged near the transition of the teat cup to the milk line.

31 Claims, 8 Drawing Sheets

MILKING DEVICE PROVIDED WITH CLEANSING MEANS

The invention relates to a milking device provided with cleansing means, in particular for cleansing/disinfecting the teat to which the milking device is connected. The invention furthermore relates to a method for cleansing the teats of an udder after milking.

From German patent application 26 22 794 such a device and method are known. This document shows a milking device for pneumatically milking a cow and the subsequent cleansing or disinfecting the teats of the cow's udder, with a system of four milk extractors, each comprising a teat cup which at one end is provided with an open lining and with the other end is connected to a milk line to a common milk collection chamber for the milk from the cow concerned, each cup having a connection to a source of changing underpressure, and an outflow opening of a line for the supply of cleansing liquid being arranged in the wall of a teat cup.

When using this known device the method used is to first place the teat cups around the cow's teats, after which the cow is milked with the help of the changing underpressure. After finishing milking the cow, while the cow's teats are still in the teat cups, a certain quantity of cleansing liquid is squirted into the teat cup with the help of a pump. Said liquid will disinfect the teat and the space in the teat cup, but will subsequently together with the milk residue in the teat cup deposit on the inner wall of the teat cup. The liquid will then have the chance, even before the teat cups have been removed from the teats, to go back past the inner wall or from the teat back down and thus partially end up in the milk line. As a result not only milk residues of a cow will be left in the teat cup and milk line but also transfer a contamination from the one cow to the other. Moreover, when milking the next cow residues of the cleansing liquid that have ended up in the milk line will end up in the central milk storage to which it is connected and therefore in the milk to be delivered.

An object of the invention is to provide a device and a method with which this is prevented.

From one aspect the invention to that end provides a device for pneumatically milking a cow, comprising a number of milk extractors, each comprising a teat cup as well as a milk line connected to the lower end of the teat cup, which leads from the teat cup to a collection chamber for the milk from the teat cups, each milk extractor being provided with a supply for a cleansing medium, such as a disinfectant, to the teat cup, in particular to the teat present in the teat cup, the supply comprising a line which at the location of an outlet debouches into the milk extractor, in particular the milk line, and each milk extractor being provided with means for closing off the milk extractor near or downstream of the outlet, preferably at that level, when discharging the cleansing medium through the outlet.

Thus, when discharging cleansing medium, and the aforementioned problem therefore exists, it is prevented that during discharging the cleansing medium, said medium can end up in the milk line and thus in the milk collection chamber.

The supply line for cleansing medium can have its outlet in the teat cup, but preferably, in the milk line, preferably as close as possible near the lower end of the teat cup. Preferably the closing means are arranged near the transition of the teat cup to the milk line, so that the portion of the milk line in which cleansing medium could possibly end up is as short as possible. The path the cleansing medium has to take in order to get into the teat cup can also be as short as possible.

Preferably, the closing means close off the supply line when in the deactivated position, so that entrance of milk therein is prevented. Preferably the closing means close off the outlet of the supply line when in the deactivated position, so that there are no blind spots present in which the milk may end up.

Preferably, the closing means comprise a closing body, which can reciprocate between a milking position in which it closes off the outlet and a cleansing position in which it closes off the milk extractor. Thus the one passage (for cleansing medium) and the other passage (to the milk collection chamber) is closed off/opened alternatingly with one single body.

Preferably, the closing body has planes for guiding the cleansing medium in the milk extractor in the direction of the teat cup, the supply line preferably debouching with a component in the direction towards the teat. In this way the closing body performs an additional function. These planes can also cooperate in the guidance of cleansing medium falling back to the supply line, where it can do no harm.

In order to promote the milk extractor to become open after the cleansing of and—possibly—the disconnection from the teat, means are furthermore preferably provided for biassing the closing body in the cleansing position towards the milking position.

Preferably, the closing body comprises an elastically flexible strip of material fixed at one end, which can be moved from the milking position to the cleansing position by bending. Preferably the elastically flexible strip is attached in the milk extractor, in particular in the milk line, near or downstream of the outlet, such as in a coupling piece between the teat cup and the rest of the milk line.

Preferably, a seat is placed in the milk extractor for sealing support of the closing body in the cleansing position, the seat preferably having a curved course in accordance with the bend line of the closing body. The closing body can then—freely or urged, see below—move towards or from the cleansing position, but provide an optimal sealing in the cleansing position.

Preferably, the seat is formed in the wall of the milk extractor, particularly in the milk line, so that the number of parts can be kept limited and moreover slits and holes in which milk could be left behind are prevented.

A simple and long term reliably working embodiment of the closing body is the one in which the strip is made of metal, particularly being a leaf spring.

The device according to the invention is preferably provided with operating means for the closing means, as well as control means for controlling the operating means in dependency of the discharge of the cleansing medium.

According to a further development of the device according to the invention, the operating means comprise an operating member, which can be moved between an active position which puts the closing means in the cleansing or closing position and a rest position. In this way it is promoted that the closing means can close off the milk line in a certain manner, for as long such is desired.

Preferably, the operating member, when in the active position, is accommodated to urge the closing means to the closing position, preferably against a returning force. The closing means are thus kept in the closing position in a positive manner, for as long such is desired. After that the returning force can be utilized for automatic clearance of the passage in the milk line.

Preferably, the operating member is in press contact with the closing means, which makes simple constructive arrangements possible. Such a arrangement may for instance be one in which the operating means comprise a pusher member and the closing means comprise a closing body which, at least in the rest position, is biassed towards the operating member.

Constructive simplicity is further promoted when the operating member and the outlet of the supply line are located on the same side of the milk extractor.

In this development the control means are advantageously adapted for activating means for pressurizing the supply line simultaneously with or shortly after activating the operating means for the closing means. The operation of the supply line and the discharge of cleansing medium will take place most reliably when the control means are adapted for activating the means for pressurizing the supply line shortly after activating the operating means for the closing means.

The closing means can also be adapted for activation by a rise of pressure in the supply line.

In the development with operating means discussed above, it is however preferred that the operating means comprise an operating line, for instance pneumatic, which is separate from the supply line, so that for supply line and for closing means the optimal operation means can always be designed.

In an alternative, further development of the device according to the invention, the operating means comprise an operating line, for instance pneumatic, which coincides with the supply line and for operation of both use can be made of the same pressure source. The closing means can then for instance be designed for activation as a result of a rise in pressure in the supply line.

Thus when discharging cleansing medium, and the aforementioned problem therefore being present, in a manner directly controlled by the rise in pressure—in connection with said discharging—it is prevented that during discharging the cleansing medium, said medium ends up in the milk line and therewith in the milk collector chamber.

The invention further relates to an assembly of a number of devices according to the invention and to a central milk storage connected to the milk collection chamber.

From another aspect, the invention provides a method for cleansing and/or disinfecting the teats of a cow's udder, after the cow has been milked with the help of a device for pneumatically milking a cow, which device comprises a milk collection chamber and a system of milk extractors, which each comprise a teat cup and a milk line extending between the teat cup concerned and the milk collection chamber, wherein immediately after milking has ended, but before the teat cup is removed from the teat a certain quantity of cleansing liquid is introduced into the teat cup, via a supply line and an outlet thereof in the milk extractor, and simultaneously or shortly after the milk extractor, in particular the milk line, is closed off near or downstream of the outlet of the supply line.

Preferably, the milk extractor is then closed off at the level of the outlet.

Preferably, the cleansing liquid is supplied with a pressurized carrier gas, such as air, during a certain period of time, which is of such a length, that the gas flow, first blows the cleansing liquid into the teat cup and subsequently blows the contents of the teat cup to the outside, so that the teat cup comes free from the teat, the milk extractor being kept closed off downstream of the outlet at least until the teat cup comes free. During the pressure blast, which causes a counter pressure wave in the direction of the teat cup and therewith a returning transport of cleansing medium, its entrance in the milk extractor, in particular the milk line, is prevented by its closing off, and namely as long as the pressure is on the teat cup. After disconnecting there is no longer danger of flowing back of cleansing medium.

Preferably, the end of the certain period of time that the gas flow is kept going is more or less the same as the moment, that the teat cup is tilted half a turn after the teat cup has come entirely free from the teat, preferably approximately 5 seconds.

Preferably, the certain quantity of cleansing or disinfecting liquid is 5 to 7 cc.

Preferably, the closing off of the milk extractor takes place with the help of a closing body, which is urged into a cleansing position which closes off the milk extractor by the gas flow or by a separate operating means. Preferably the closing member closes off the outlet when there is no gas flow.

From another aspect, the application has the object to provide a method, as a result of which the teats of a cow's udder are cleansed well and as much residue of milk left behind and the introduced cleansing liquid as possible are removed from the teat cup such that it cannot end up in the milk.

To that end the application provides a method for cleansing and/or disinfecting the teats of a cow's udder, after the cow has been milked with the help of a device for pneumatically milking a cow, which device comprises a system of teat cups which are each connected to a milk line, a cleansing liquid being introduced into the teat cup via a line and an inflow opening, which method comprises the introduction of a certain quantity of cleansing liquid immediately after the milking has ended, but before the teat cups have been removed from the teats with the help of means via an outflow opening, which outflow opening corresponds with the inflow opening for the liquid in the teat cup, the means consisting of a gas flow, such as an air flow, which is blown or squirted into the teat cup under pressure via the outflow opening during a certain period of time, the period of time being such that the air flow first blows the cleansing liquid into the teat cup and pressurizes the space in there and preferably subsequently blows the contents of the teat cup to the outside, which promotes the release of the teat cup.

According to this method, the cleansing liquid will spread over the space between the teat and the teat cup and keep the space under a certain pressure until the release of the teat cup, as a result of which the teat cup can easily be detached from the teat. It appeared that the air flow blows the milk residues which are left behind in the teat cup after milking, together with the surplus of cleansing liquid to the outside.

Preferably, the cleansing liquid is squirted in an aimed manner into the direction of the axis of symmetry of the teat cup. In this way it is achieved that first the teat is cleansed from the milk residues and subsequently these milk residues with the cleansing liquid are blown to the outside via the inner wall of the teat cup.

In a further development thereof, the application provides a device with which it is achieved in the optimal sense that the cleansing liquid ends up on the teat end of the cow. To that end the application provides a device for pneumatically milking a cow, comprising a system of teat cups which each are provided with an open lining at one end and with their other end are connected to a milk line, each cup comprising a connection to a source with changing underpressure, and in which a cleansing medium, such as a disinfecting liquid, can be introduced into the tea cup via an inflow opening which is the outflow opening of a line for the supply of the cleansing liquid, the outflow opening for the cleansing medium being provided with a tube-shaped member, of which the centre line is more or less parallel to the axis of symmetry of the teat cup and of which the outflow opening is directed towards the end of a cow's teat present in the teat cup during use.

With these measures it is achieved that first, the end of a cow's teat is sprayed with the liquid, as a result of which milk residues that are still hanging at the lower end of the udder are blown away and subsequently with the upward air flow along the outside of the udder and the wall of the teat cup to the open upper side of the teat cup and subsequently to the outside out of the space of the teat cup after it has been released from the teat. In this way the entire inside of the teat cup and the cow's teat are cleansed well and disinfected and all milk residues are efficiently removed from the teat cup at the end of a milking course. The milk residues that have ended up on the inside of the teat cup when the teat is spray cleansed, and the milk residues left there when milking can thus be removed from the teat cup, so that there is no danger of contamination for the next cow to be milked, if the milked cow should have an infection.

Preferably the device according to the invention is constructed such that a supply line for the supply of the cleansing liquid is arranged in the wall of each milk line near the transition to the teat cup and the tube-shaped part of the tube-shaped member along the wall of the milk line runs parallel to the axis of symmetry of the teat cup. From applicant's European patent EP 0 543 463 a device for pneumatically milking a cow is known per se, which device is provided with means for cleansing the inside of the teat cup subsequent to milking, comprising a system of teat cups which each are provided with an open lining at one end and with their other ends are connected to a milk line, each cup comprising a connection to a source with changing underpressure, and in which an outflow opening of a line for the supply of cleansing liquid is arranged in the wall of each milk line near the transition to the teat cup. The liquid flow here however is directed at the wall of the teat cup.

Preferably, the member is a tube which connects to the outflow opening of the supply line and which is mainly pressed flat and abuts the inside of the milk line and in which a closing valve is arranged in the outflow opening of the supply line. This embodiment is easy and simple to apply by first, in the known manner as indicated in applicant's European patent EP 0 543 463, providing a supply line with a closing valve in the wall of the milk line which supply line is already provided with a pipe arranged in line with the supply line which pipe is contiguous to the outflow opening and subsequently with help of a mandrel pressing the pipe flat against the wall of the milk line. Because the pipe will spring back a little the pipe will exactly take the wanted position, the outflow of the gas and the cleansing liquid exactly being directed at the end of the cow's teat when said teat is in the teat cup.

Preferably, a closing valve is arranged in the outflow opening of the supply line, so that no milk can come into the supply line for the cleansing liquid and moreover no cleansing liquid can flow out of the supply line if not under a certain pressure.

According to a preferred embodiment, the first closing valve is arranged in a connecting piece, which is accommodated in a first branch of the milk line. In this way the supply line for the cleansing liquid is separated from the milk line and the supply line can easily be connected to and disconnected from the milk line, for instance with maintenance or repair.

Preferably, the branch with connecting piece is part of a coupling piece, which can be coupled between the teat cup and the milk line. In this way a separate part is provided which can be placed under the teat cup in the milk line and to which the supply line for the cleansing liquid can be connected. In this manner the milk line is modular, and the coupling piece can easily be replaced, for instance when the closing valve does not function well. It is also possible to arrange such a provision in already existing devices for mechanical milking of cows.

The invention also relates to a coupling piece as described above.

The invention will be elucidated below on the basis of a number of exemplary embodiments, while referring to the drawing, in which.

Figure 1:
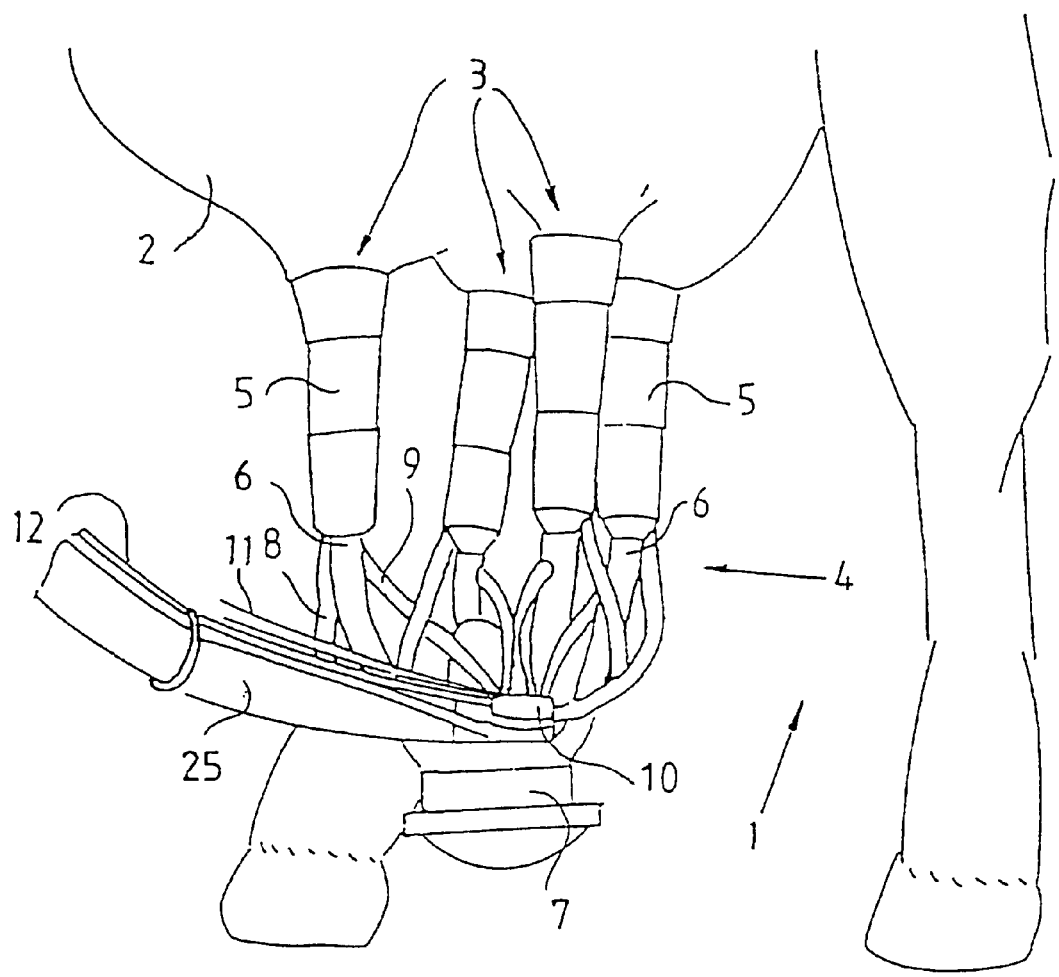
FIG. 1 shows a device according to the invention arranged below a cow.

FIG. 1 shows a cow 1 of which only the hind legs are shown with an udder 2, with four teats 3, in which a device 4 according to the invention is arranged around the teats 3 of the udder 4 of the cow 1.

The device 4 for pneumatically milking a cow here comprises four milk extractors, which each comprise a teat cup 5 and a milk line 6, the milk lines 6 supplying the milk to a milk collection chamber 7, from where the milk is transported to a central storage via common discharge line 25. Each teat cup 5 is connected via line 8 to a source of changing underpressure, with the help of which the milking is carried out. Near the transition of the teat cup 5 to the milk line 6 the milk line 6 is provided with a supply line 9, which supply lines 9 are connected to manifold 10 for cleansing liquid, such as iodine, which is supplied via line 11. Via line 12 the air is supplied under pressure to the manifold 10 in order to blow the liquid under the influence of air into the teat cup.

Figure 2A:
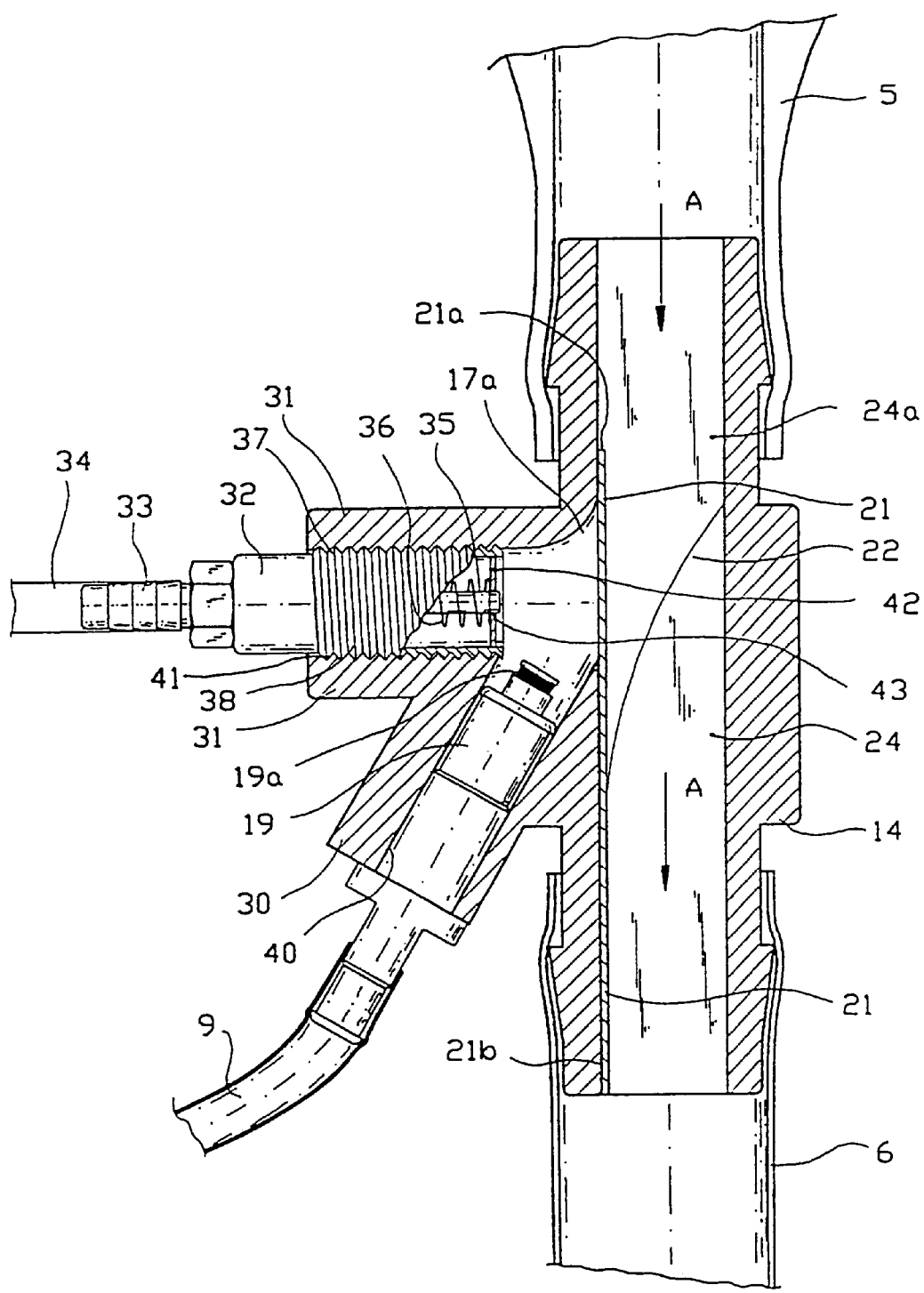
FIGS. 2A and 2B show cross-sections of the upper end of a milk line of a first exemplary embodiment of a device according to the invention, in the milk position and the cleansing position respectively.

In FIG. 2A a coupling piece 14 is clamped in the lower end of the teat cup 5, which coupling piece forms the upper end of the milk line 6, of which the remaining hose-shaped part is clamped on the lower end of the coupling piece 14. The coupling piece 14 defines a vertical passage 24 which has a rectangular cross-section and on two opposite inner surfaces is provided with a curved step 22, which forms a valve seat. Against (as seen in the drawing) the left inner surface of the passage 24 in the coupling piece 14, a leaf spring 21 is placed, which at the location of the portion 21b is fixed arranged to said inner surface, in a manner comparable to a restraint, but for the rest can be bent freely in the direction to the right, until in abutment with the seat 22. Also see the discussion of the leaf spring 121 of the FIGS. 3A, 3B.

At the side of the leaf spring 21 facing away from the passage 24 the coupling piece 14 is formed with two blocks 30 and 31, in which on the block 30 a supply line 9 for cleansing liquid such as iodine is connected, which supply line may lead to a manifold for cleansing liquid such as the manifold 10 mentioned before in FIG. 1. Alternatively, as is suggested in FIGS. 3A, 3B to each supply line 9 connected to a pressurized air source an own line for dosing cleansing liquid can be connected. In the block 30 a bore hole 40 is formed, which ends in a debauching 17, which is covered by the leaf spring 21. In the bore hole 40 a one way valve 19 is placed with valve 19a. In case the supply line 9 is pressurized, by a pressure source and control means that are not further shown here, the valve 19a will move from the seat to the debouching 17 and as a result make a passage of pressurized air with cleansing liquid past it possible.

In the block 31, which is formed as a unity with block 30, also a bore hole 41 is arranged, which is provided with a screw thread 38. In the screw thread 38 a bush 32 provided with an external screw thread 37 is screwed, which is closed off towards the debauching 17 by a plate 42 with a hole 43 and on the other side is provided with a connection nipple 33 for a pressurized air lead 34. Within the bush 32 is a piston pin 35, around which a compression spring 36 has been placed, which on the one side abuts against the plate 42 and on the other side abuts against a piston forming a unity with the piston pin 35 which piston is not further shown. When the control means that are not further shown activate a pressurized air source that is not further shown and the line 34 is pressurized, the piston which is not shown will move to the right in bush 32 and as a result the piston pin 35 will move through the hole 43 in the plate 42 to the outside, and contact the leaf spring 21.

During milking the milk flows in the direction A from the teat cup through the passage 24 and further downwards in the milk line 6. When the milking is ended and the teat cups 5 are still around the teat of the cow, the control means first pressurize the line 34 so that the piston or pusher pin 35 presses the leaf spring 21 to the inside in the passage 24, until the leaf spring 21 with the longitudinal edges abuts the seat 22 and with the upper edge 21a abuts the opposite surface 24a of the passage 24. The length of the leaf spring here is adjusted to the dimensions of the passage 24 and the course of the seat 22. In the situation shown in FIG. 2B the passage 24 is closed off below the leaf spring 21 and subsequently (a fraction of a second after that) the supply line 19 is operated by the control means that are not further shown, so that cleansing liquid from the line 9 and via the one way valve 19 can be emitted in the direction B, to the teat in the teat cup 5. The liquid on the one hand is guided here along rounded surface 17a and on the other hand by the leaf spring 21. As a result of the passage 24 being closed off towards the rest of the milk line 6 the cleansing liquid will if it falls back end up in the debauching 17, but will not be able to move in the direction C, so that the previously collected milk cannot be reached.

Figure 2B:
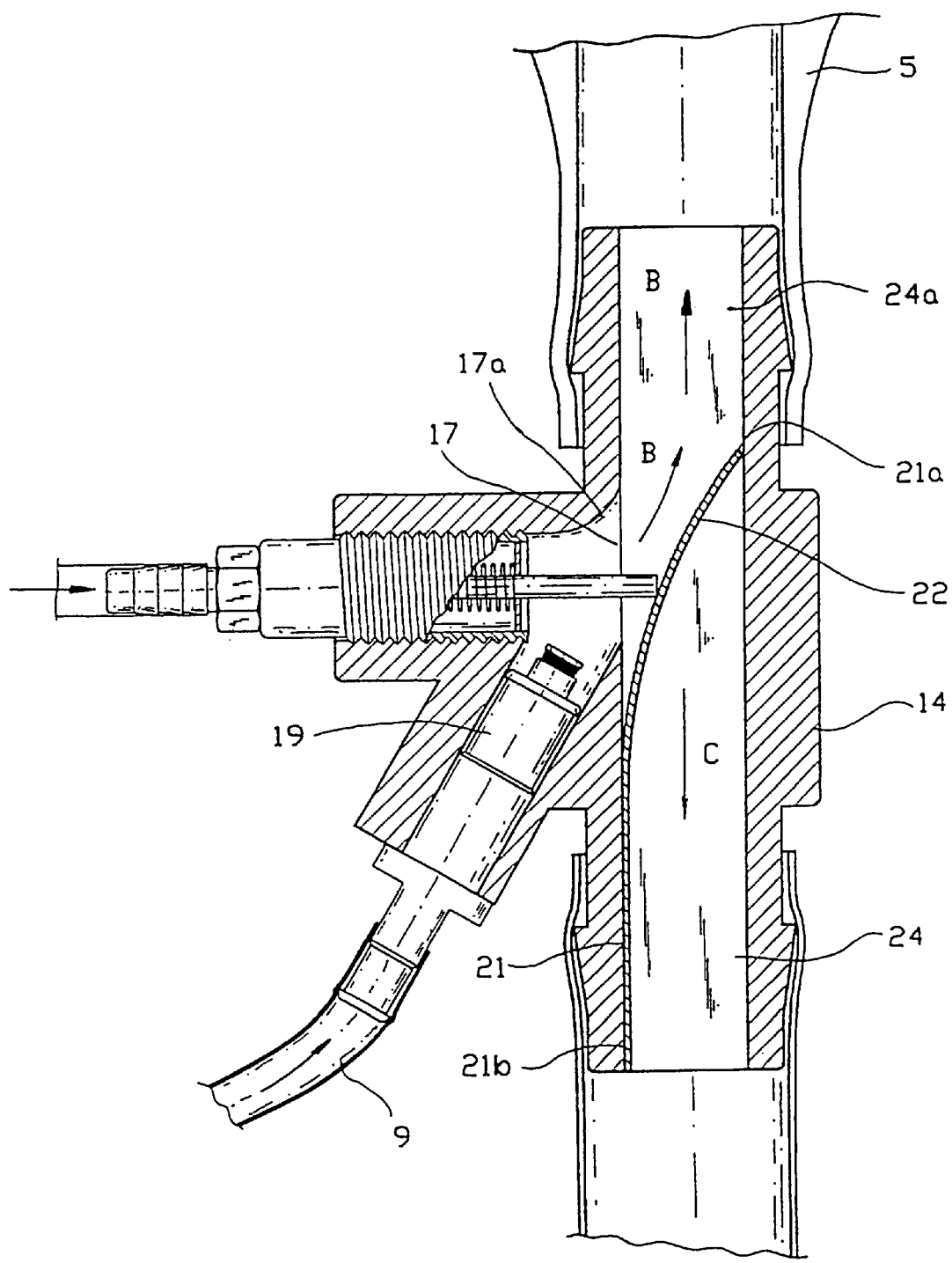

By keeping the pressure in the line 34 constant in the situation shown in FIG. 2B the pusher 35 will remain in position and the leaf spring 21, clamped between the pusher 35 and the seat 22, is kept in the bent closing position in a stable manner. When the cleansing is ended, the cease of pressure in the line 34 will result in the compression spring 36 becoming active and move the piston that is not shown with the pusher 35 to the left again, which movement is followed by the leaf spring 21, in order to end up again in the position shown in FIG. 2A, in which the passage 24 is free again. Of course the pressure on line 9 has ceased then as well.

Figure 3A:
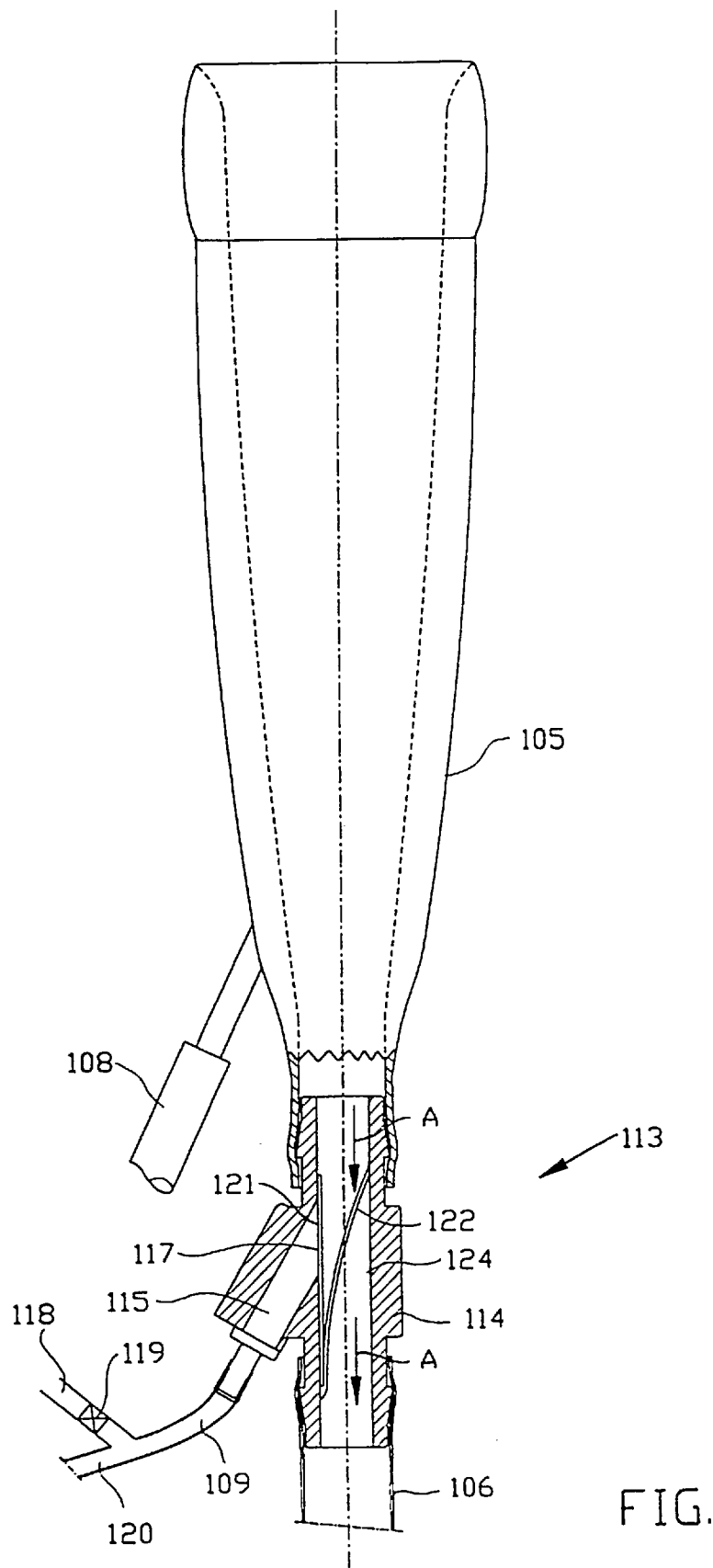
FIGS. 3A and 3B show a partial cross-section of the teat cup and the upper end of a milk line of a second exemplary embodiment of the device according to the invention, in the milk position and the cleansing position respetively.

In FIGS. 3A, B the same parts have the same reference numbers, increased by 100.

FIG. 3A shows the upper end of a milk extractor, in which a teat cup 105 is connected to the rest of the milk line 106 via a coupling piece 113 which is a part of the milk line and in which an important part of this embodiment of the invention is accommodated. The coupling piece 113 has a milk passage 124 and a branch 115 for the supply line 109. The branch 115 debouches at the level of the outlet 117 in the milk passage 124. The opening 117 is shown in a situation in FIG. 3A in which milking takes place and milks flows in the direction A, covered by a strip-shaped valve 121, comparable to leaf spring 21 and therefore consisting of a metal leaf spring, which for instance is 4 cm long and for 1 cm fixed to the inner wall of the passage 124, so that as it were a restraint is formed. The remaining 3 cm of the leaf spring can be bent towards the passage 124 under the influence of an (air)pressure load, until the leaf spring 121 sealingly abuts the step 122 formed in the wall of the passage 124, which step forms the valve seat. The curve of the seat is similar again to the curve of the leaf spring 121 as a result of the evenly distributed load.

The passage 124 has a square cross-section in order to facilitate the movement of the leaf spring 124.

Figure 3B:
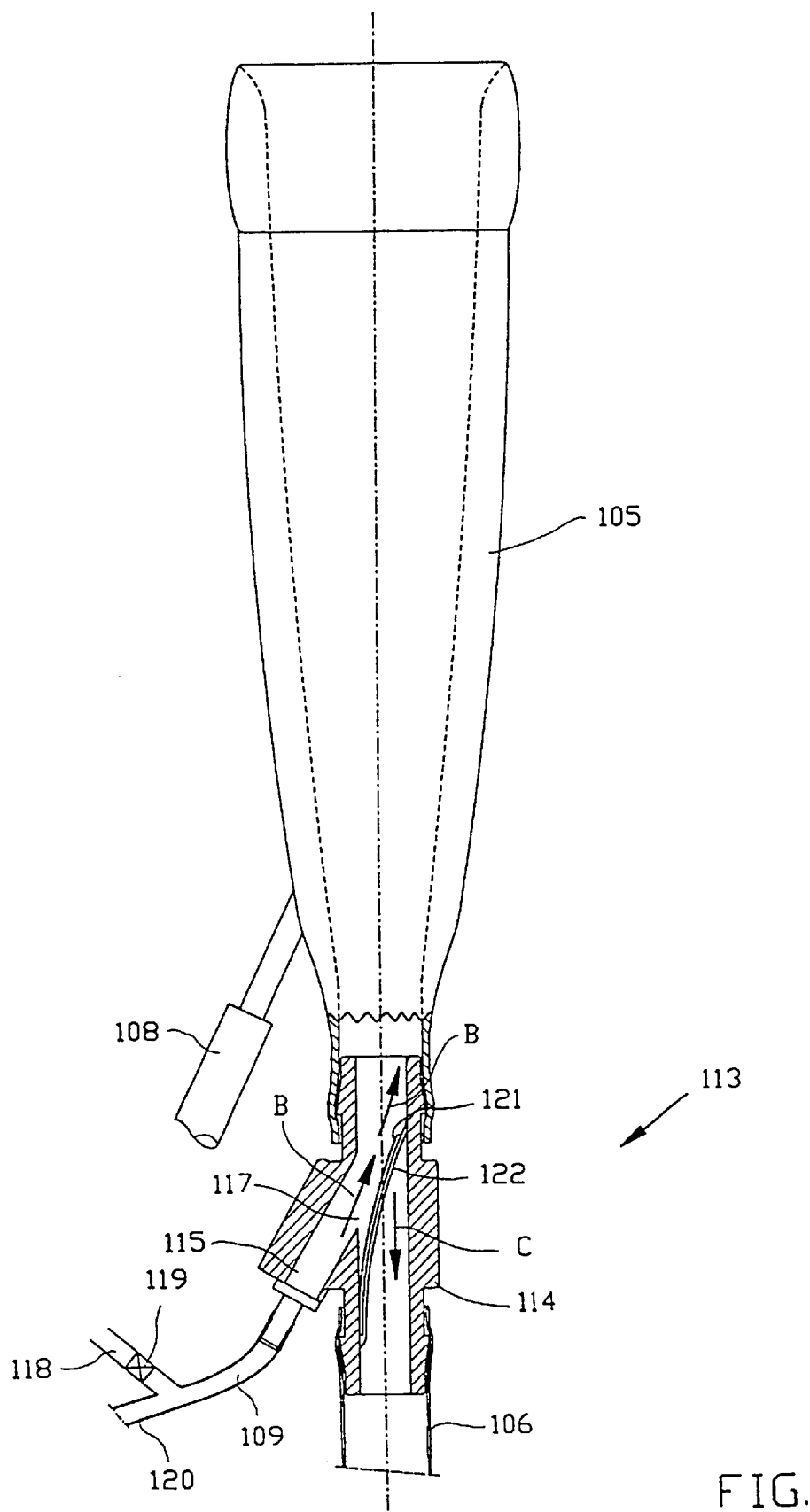

The supply of the cleansing liquid here takes place in an alternative manner. On the line 109 a line 118 debouches, in which also a valve 119 is accommodated and through which line cleansing liquid dosed in a for the teat concerned wanted quantity (preferably 5–7 cc) is introduced into the line 109. Via a line 120 connected to the central pressure source—controlled by the central control means that are not shown—air is supplied at the wanted moment under the wanted pressure, as a result of which the liquid is transported along and the leaf spring 121 is pressed open and bent until in abutment with the seat 122, as is shown in FIG. 3B. The cleansing liquid is guided along by the leaf spring 121 also and moves upwards in the direction B towards the teat (not shown). A returning movement of the cleansing liquid downwards, in the direction C to the rest of the milk line is prevented by the leaf spring 121 abutting the seat 122. Cleansing liquid can in that case possibly get back into the branch 115, which is not a problem.

Preferably, the increased pressure is maintained for some seconds, for instance 5 seconds, after the cleansing liquid has been emitted. In this way the cups can be urged from the teats, but also any risk of the cleansing medium flowing back into the milk line is prevented, because as a result of the pressure the leaf spring 21, 121 keeps on closing off the milk line 6, 106, until the teat cups have fallen off the teats and no returning pressure blast may occur.

Figure 4A:
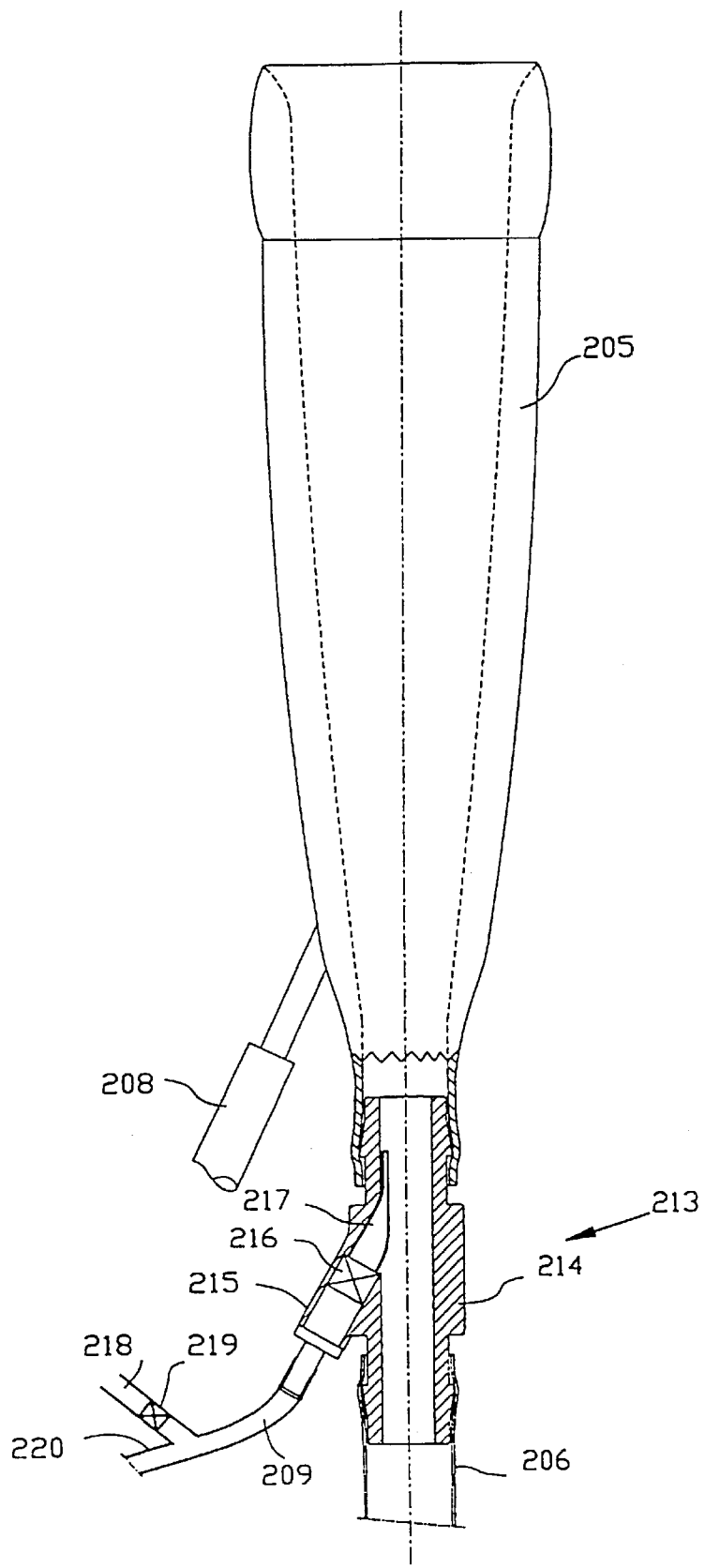
FIG. 4A shows a cross-section of a teat cup of a further alternative device according to the invention.
Figure 4B:
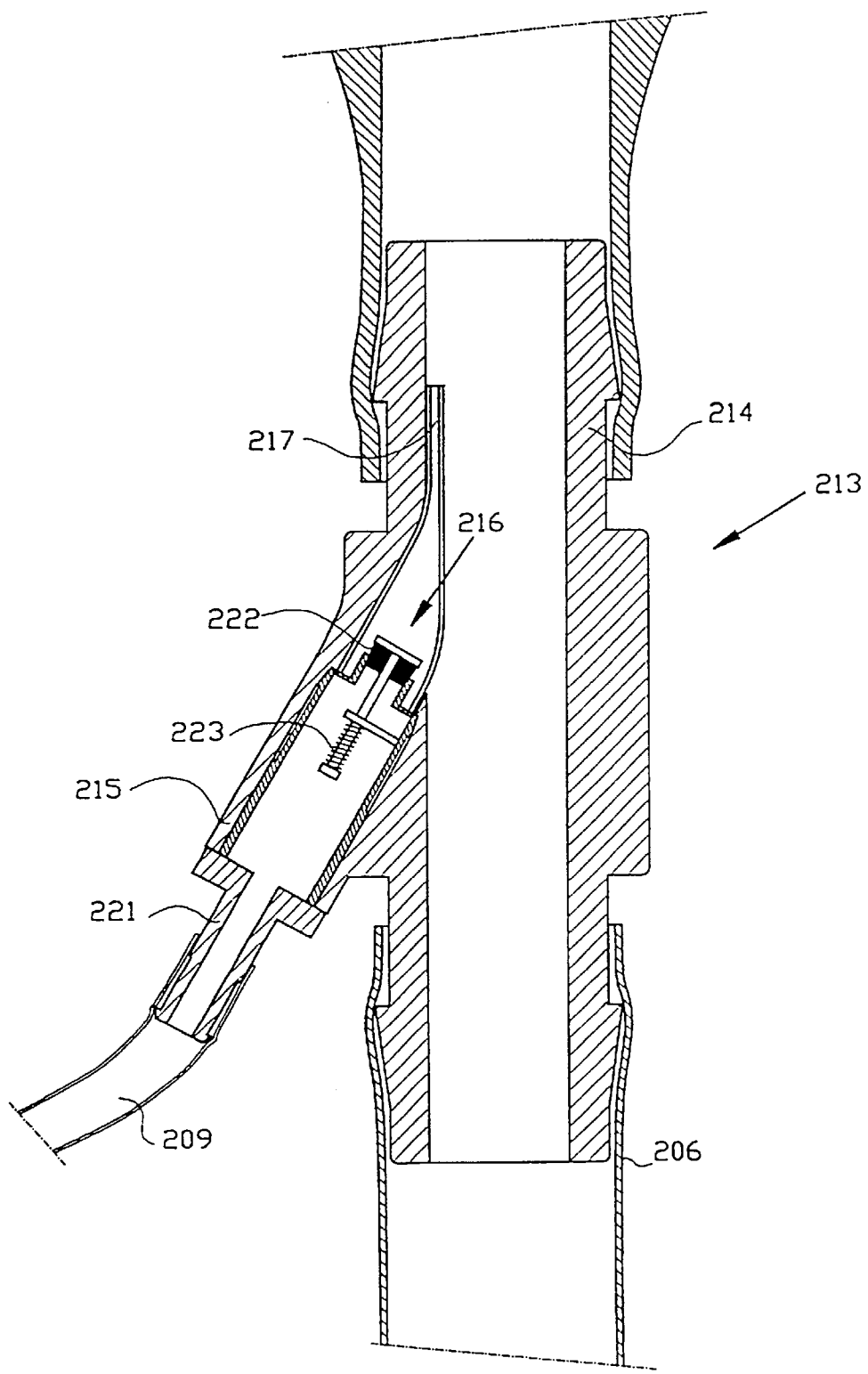
FIG. 4B shows an enlarged cross-section of the coupling piece for the connection of the line for the cleansing liquid of FIG. 4A.

FIG. 4A shows a teat cup 205 to which a coupling piece 213 according to the invention had been connected. Line 208 is the line to the source of changing underpressure. The coupling piece 213 consists of a tube-shaped part 214 with two ends to which the milk line 206 is connected to both the upper side and the lower side, just below the teat cup 205 and has a branch 215 for a supply line 209 for a cleansing medium. In the branch 215 a valve 216 is accommodated on the one hand to be able to discharge the cleansing liquid at the wanted moment and for the wanted time and on the other hand preventing the milk from entering the supply line 209 of the cleansing liquid. On the valve 216 a tube 217 has been arranged, which extends into the milk line 206 and with the help of a mandrel (not shown here) is pressed into the wanted shape. As a result the round tube is bent and pressed flat against the wall of the milk line.

The jet of the cleansing liquid which is supplied through the supply line 209 will be squirted out of tube 217 and directed parallel to the centre line of the teat cup 205 at the teat (not shown). On the line 209 a line 218 debouches, in which also a valve 219 is accommodated and through which line, dosed in the wanted quantity, the cleansing liquid is introduced into the line 209. Via the line 220 air is supplied at the wanted moment under the wanted pressure, as a result of which the quantity of liquid introduced in the line will be squirted in the teat cup 205 via the valve 216.

FIG. 48 shows a coupling piece 214 from FIG. 4A strongly enlarged. In the branch 215 of the coupling piece 214 a valve 216 is arranged in its branch, to which a connection end 221 for the supply hose 209 for the air and cleansing liquid is arranged. The valve 216 is designed here as a valve 222, which with the help of a spring 223 is pressed on the seat 224. When cleansing liquid is supplied under pressure via the supply line 214 or 215, the valve 222 is pressed to the outside counter to the activity of the compression spring 223 by the pressure of the air with the cleansing liquid, after which the cleansing liquid is squirted upwards in the teat cup on the teat via the flattened tube 217.

Figure 5D:
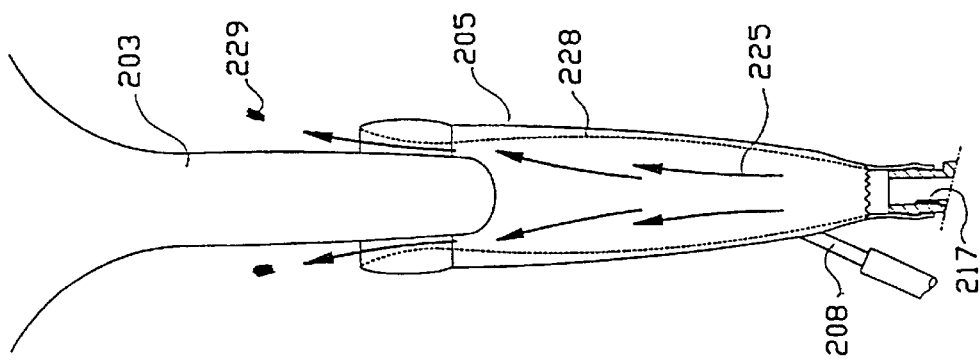
FIG. 5 shows a cross-section of the teat cup of FIGS. 4A and 4B during the introduction of cleansed liquid and air.
Figure 5C:
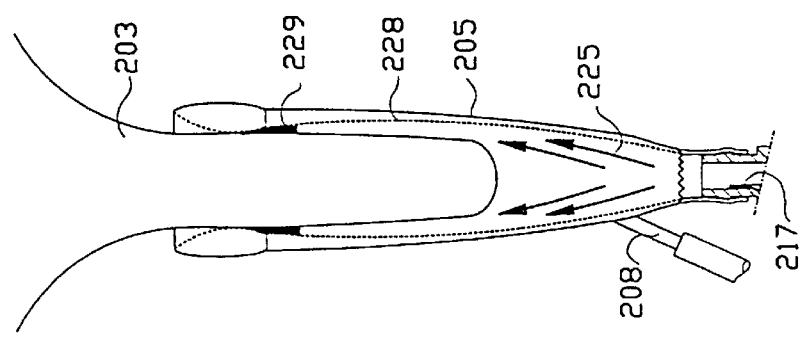
Figure 5B:
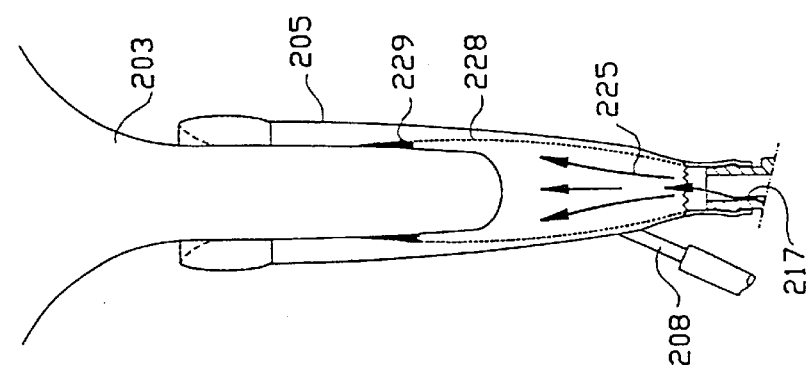
Figure 5A:
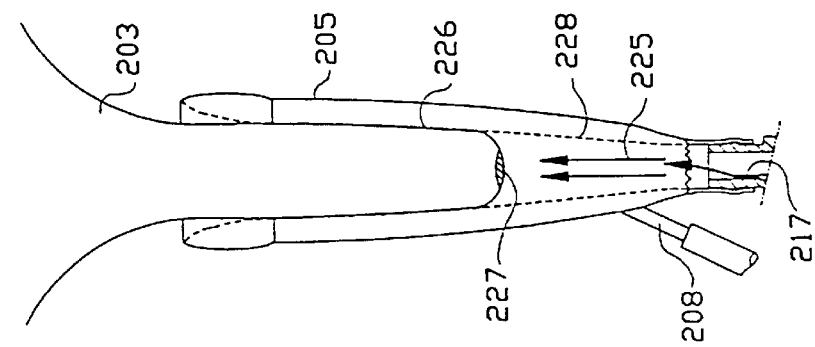

In FIG. 5 the method is shown in four stages, FIG. 5A showing the teat 203 with the teat cup 205, while the cleansing liquid together with the air flow 225 is blown into the inside of the teat cup 205 via the outlet of the flattened tube 217, directed at the teat end 226. The air flow 225 is directed at the milk residues 227 which are at the lower end of the cow's teat. In FIG. 5B the moment is shown that the inner lining 228 of the teat cup 205 is pressed to the outside by the incoming air flow and the milk residue with the cleansing liquid 229 blown in is blown upwards and subsequently as shown in FIG. 5C to the upper side of the teat cup and possibly after that to the outside as shown in FIG. 5D. The release of the teat cup 205 from the teat 203 as a result is particularly promoted and the teat cup 205 will afterwards be able to fall down. The cow's teat as well as the inside of the teat cup will then be entirely cleansed from milk residues and also disinfected with the help of the disinfecting liquid.

What is claimed is:

1. A device for pneumatically milking a cow comprising: a plurality of milk extractors and a collection chamber for collecting milk from the plurality of milk extractors, each of the milk extractors comprising:
   (i) a teat cup having a lower end;
   (ii) a milk line connected to the lower end of the teat cup, the milk line leading from the teat cup to the collection chamber;
   (iii) supply means for supplying a medium through the milk line to the teat cup whereby to treat a teat in the teat cup, said supply means comprising a supply line which debouches through an outlet into the milk line;
   (iv) closing means for closing off the milk line at, near or downstream of the outlet to prevent medium supplied by the supply means from passing through the milk line into the collection chamber while permitting medium supplied by the supply means to pass through the milk line to the teat cup, said closing means being movable between an activated position in which the closing means closes off fluid communication through the milk line between the teat cup and the collection chamber and an inactivated position in which the milk line between the teat cup and collection chamber is open.

2. A device according to claim 1, wherein the teat cup of each of the plurality of milk extracts is coupled to the milk line at a transition, the closing means being disposed near the transition of the teat cup to the milk line.

3. A device according to claim 1, wherein the closing means closes off the supply line with the closing means in the deactivated position.

4. A device according to claim 3, wherein the closing means closes off the outlet with the closing means in the deactivated position.

5. A device according to claim 4, wherein the closing means comprises a closing body, which reciprocates between a milking position in which it closes off the outlet and a cleansing position in which it closes of the milk line between the teat cup and the collection chamber.

6. A device according to claim 5, wherein the closing body comprises planes for guiding cleansing medium in each of the plurality of milk extractors in the direction of the teat cup.

7. A device according to claim 6, comprising means for biasing the closing body towards the inactivated position.

8. A device according to claim 7, wherein the closing body comprises an elastically flexible strip of material fixed at one end, which can be moved from the inactivated position to the activated position by bending.

9. A device according to claim 8, wherein the elastically flexible strip is attached in the milk extractor downstream of the outlet.

10. A device according to claim 8, wherein the milk extractor comprises a seat for sealing support of the closing body with the closing means in the activated position.

11. A device according to claim 10, wherein the seat has a curvature that corresponds with a curvature of the closing body.

12. A device according to claim 10, wherein the seat is formed in a wall of the milk extractor.

13. A device according to claim 8, wherein the strip is made of metal.

14. The device according to claim 6, wherein the supply line debouches into the milk line in a direction towards the teat.

15. A device according to claim 1, further comprising operating means for moving the closing means, and control means for controlling the operating means based on discharge of the medium.

16. A device according to claim 15, wherein the operating means comprises an operating member which is movable between an active position, which moves the closing means to the activated position, and a rest position.

17. A device according to claim 16, wherein the operating member urges the closing means to the activated position with the operating means in the active position.

18. A device according to claim 17, wherein the operating member is in press contact with the closing means.

19. A device according to claim 18, wherein the operating member comprises a push member and the closing means comprises a closing body which, at least in the rest position of the operating means, is biased towards the operating member.

20. A device according to claim 16, wherein the operating member and the outlet are disposed on a same side of the milk extractor.

21. A device according to claim 15, comprising means for pressurizing the supply line, wherein the control means is adapted for activating the means for pressurizing the supply line simultaneously with or shortly after activation of the operating means.

22. A device according to claim 21, wherein the control means is adapted for activating the means for pressurizing the supply line shortly after activation of the operating means.

23. A device according to claim 22, wherein the operating means comprises an operating line which is separate from the supply line.

24. The device according to claim 23, wherein the operating line is a pneumatic line.

25. A device according to claim 15, wherein the closing means is adapted for activation by a rise of pressure in the supply line.

26. A device according to claim 15, wherein the operating means comprises an operating line which coincides with the supply line.

27. The device according to claim 15, wherein the operating line is a pneumatic line.

28. A device according to claim 1, wherein the closing means is accommodated in a coupling piece which is accommodated in the milk extractor.

29. The device according to claim 28, wherein the coupling piece is accommodated near a transition between the teat cup and the milk line.

30. The device according to claim 1, wherein the medium is a cleansing medium that comprises a disinfectant.

31. A method for milking a cow having a plurality of teats, the method comprising:

(a) providing the device of claim 1;

(b) placing the teat cup of each of the plurality of milk extractors around a teat of the cow and milking the cow such that milk from each of the plurality of milk extractors flows through the milk line to the collection chamber; and (c) immediately after the milking has ended but before removal of the teat cups from the teats, moving the closing means to the activated position to close off the milk line and simultaneously or shortly thereafter supplying cleansing or disinfecting medium through the milk lines to the teat cups.

* * * * *